United States Patent [19]

Litty

[11] Patent Number: 4,923,673
[45] Date of Patent: May 8, 1990

[54] METHOD FOR PRODUCING ALLOYED TUNGSTEN RODS

[75] Inventor: Richard Litty, Sondermoning, Fed. Rep. of Germany

[73] Assignee: Gesellschaft fur Wolfram-Industrie mbH, Traunstein, Fed. Rep. of Germany

[21] Appl. No.: 399,620

[22] Filed: Aug. 28, 1989

[30] Foreign Application Priority Data

Oct. 17, 1988 [DE] Fed. Rep. of Germany ....... 3835328

[51] Int. Cl.$^5$ .............................................. B22F 3/24
[52] U.S. Cl. ....................................... 419/20; 419/23; 419/28; 419/29; 419/38
[58] Field of Search ....................... 419/20, 23, 28, 29, 419/38

[56] References Cited

U.S. PATENT DOCUMENTS

| | | | |
|---|---|---|---|
| 3,169,861 | 2/1965 | Ehringer | 419/20 |
| 3,927,989 | 12/1975 | Koo | 75/207 |
| 4,229,873 | 10/1980 | Bykhovsky et al. | 29/420 |
| 4,602,956 | 7/1986 | Partlow et al. | 75/235 |

Primary Examiner—Stephen J. Lechert, Jr.
Attorney, Agent, or Firm—Spensley, Horn, Jubas & Lubitz

[57] ABSTRACT

In a method for producing tungsten-alloyed rods, a particular tungsten electrodes for tungsten inert gas welding, tungsten plasma welding, tungsten plasma fusion cutting and the like, in which pulverulent tungsten with an admixed oxide additive is compacted, sintered, mechanically worked and submitted to a recrystallization treatment, to achieve a hitherto unobtained high lanthanum integration the pulverulent tungsten is alloyed with a highly pure relaxed lanthanum oxide additive of about 1.8 to 2.2% by weight with respect to the total weight the compacting is carried out with a multiphase pressure buildup and the sintering is carried out with a multiphase temperature buildup.

8 Claims, 4 Drawing Sheets

METHOD FOR PRODUCING ALLOYED TUNGSTEN RODS

The invention relates to a method for producing alloyed tungsten rods, in particular tungsten electrodes for tungsten inert gas welding, tungsten plasma welding, tungsten plasma fusion cutting and the like, according to the preamble of claim 1.

Tungsten rods with additional additives of lanthanum, thorium, yttrium, zirconium and cerium oxide have been commercially available for years, cf. DIN 32 528. Tungsten electrodes contain the aforementioned oxidic additives to improve the emission properties. Most frequently, thorium oxide additives with a content up to 4 % by weight are used because thoriated tungsten electrodes have better ignition properties, greater arc stability, higher current loadability and longer life. A disadvantage in the known tungsten alloys with thorium oxide is that they are generally difficult to work and require high energy expenditure for the sintering. Thorium oxide attaches itself to the grain boundaries of the tungsten and leads to recrystallization inhibition. However, high recrystallization is required for further working, for example to produce thin tungsten rods.

The thorium oxide component is moreover undesirable because it has radiation properties. This radiation is for example unfavourable in nuclear reactor construction because an additional radiation source is implanted thereby.

Efforts to replace the thorium oxide in alloyed tungsten bars or rods, in particular in tungsten electrodes, by another additive more compatible with the environment and simultaneously affording advantages in the production and industrial use have so far not achieved any appreciable success. The use of lanthanum oxide additives which in such tungsten electrodes could lead to an improvement of the arc stability, ignition at lower voltage and a higher operating life has in practice so far not gone beyond the low proportion of about 1 %.

This is due on the one hand to the fact that taking account of the higher specific weight of thorium oxide compared with lanthanum oxide for 1 part by volume thorium oxide about 1.8 parts by volume lanthanum oxide would have to be used and because of the recrystallization-inhibiting effect of lanthanum oxide working with the aid of recrystallization can be carried out only with very great expenditure.

In addition, a higher lanthanum oxide content reduces the stability of the compacts. Thus, hitherto with a lanthanum content of about 1 % by weight the compact disintegrated after about 10 minutes. This disintegration takes place after about 2 to 3 minutes with 2 % by weight lanthanum oxide additive. The additive of lanthanum oxide thus leads to increased stresses occurring in the compact which lead to a disintegration of the compact, this effect being intensified on increasing the lanthanum oxide content. Efforts so far to alloy a higher lanthanum oxide content into tungsten rods or bars, in particular tungsten electrodes, have not been successful.

The aforementioned disadvantages also apply to a method of the type mentioned at the beginning which is known from DE-OS 3,701,212. In addition, an unfavourable aspect of this known method is the use of lanthanum nitrate which is employed in an aqueous solution and must be prepared in a manner requiring such time and energy. Furthermore, problems arise due to the homogeneous lanthanum distribution because here a recrystallization inhibition occurs at the outer periphery of the rod which again makes the further production difficult. In practice this known method is thus of no significance, in particular for economic reasons.

The invention is based on the problem of further developing a method of the type set forth at the beginning in such a manner that with the smallest possible expenditure of energy tungsten-alloyed rods, in particular tungsten electrodes, can be made which have a lanthanum oxide content of about 2 % by weight.

According to the invention this problem is solved by the features characterized in claim 1.

Preferred features advantageously further developing the invention are set forth in the subsidiary claims.

With the method according to the invention in advantageous manner for the first time integration of a higher lanthanum oxide content than hitherto is made possible without any problems. The firing or ignition properties of a welding electrode made by the method are favourably influenced in particular in so far as a firing is possible at a lower voltage compared with thoriated tungsten electrodes and that an improved arc stability and above all longer service life can be achieved. Moreover, lanthanum is not an active radiator.

A further advantage is that the sintering temperature of the tungsten-lanthanum oxide alloy is reduced compared with the thorium oxide-tungsten alloy and as a result less energy expenditure is required for sintering the lanthanum oxide-tungsten alloy.

Moreover, the method according to the invention has the advantage that it is not necessary as hitherto to operate stepwise with all sintering apparatuses but that now mixing and compacting and sintering for each rod can be carried out continuously. Advantageously, with the method according to the invention either the compacting can be carried out with a multiphase pressure buildup separately from the sintering with a multiphase pressure buildup or a compacting with simultaneous presintering or a hot-isostatic compacting taking account of the multiphase pressure and temperature buildup. Due to the dimensional stability of the compact achieved with the method according to the invention in addition an enormous flexibility is obtained in the production of alloyed tungsten rods, in particular tungsten electrodes with an increased lanthanum oxide content.

For the preparation the lanthanum oxide is relaxed in a preparatory method step by a volume-increasing treatment. This volume-increasing treatment is effected by storing or aging at 25 to 30° C. for at least 20 hours and thereafter for execution of the production method the lanthanum oxide with an average grain size of 0.5 to 2 μm is added. According to a preferred further development of the invention the relaxing volume-increasing treatment is effected by thin-layer maintaining of the lanthanum oxide for several days at about 25 to 30° C.

The compacting of the alloy, which is carried out with a multiphase pressure buildup, is preferably effected through two maintaining or retention stages in a preferred further development of the invention the first maintaining stage is in a pressure range of 900 to 1100 bar and achieved after about 1.5 to 2.5 minutes and is retained for about 1 minute; the second maintaining stage lying substantially in the pressure range of 1700 to 1900 bar, is achieved about 1.5 to 2.5 minutes after the first maintaining stage and is retained for about 1 minute, and the maximum pressure of about 2200 bar is reached about 1.5 to 2.5 minutes after the second maintaining stage. The maximum compacting pressure is advantageously maintained for about 1 to 2 minutes.

The multiphase temperature buildup provided for the sintering is carried out advantageously over two temperature maintaining stages. The temperature increase is preferably carried out in such a manner that after about 4 to 6 minutes a first maintaining stage at about 900 to 1100° C. is reached and this is retained for about 2 to 4 minutes, that the second maintaining stage at about 1700 to 1900° C. is reached after a further time of about 1 to 3 minutes and then retained for about 2 to 4 minutes, and that the maximum sintering temperature in the region of 2700° C. is reached after about a further 3 to 5 minutes. The maximum sintering temperature is preferably maintained for about 14 to 16 minutes.

In the following description the invention will be explained in detail with the aid of the attached drawings, wherein.

Figure 3:
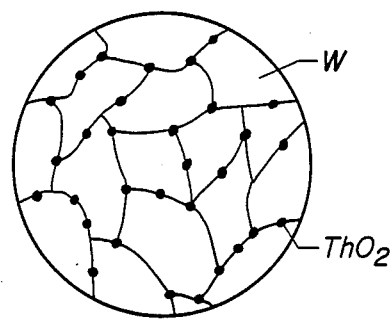
FIG. 3 is an enlarged section through a compacted blank of tungsten having 2 % thorium oxide according to the prior art.

With reference to FIGS. 3 to 6 firstly the hitherto known method for producing alloyed tungsted rods, in particular tungsten electrodes, with 2 % thorium oxide content will be briefly explained. In the conventional alloy the alloy additives with an average grain size of 1 $\mu$m are added as oxide to the tungsten metal powder, the uniform distribution of the additives being effected by a subsequent mechanical mixing operation. This is followed by a compacting operation which is effected either hydraulically with subsequent presintering or isostatically, a directed pressure decrease not being absolutely essential with isostatic compacting. FIG. 3 shows an enlarged section through a compacted blank, uniformly coarse tungsten grains W with homogeneous thorium oxide distribution ($ThO_2$) being apparent.

Figure 4:
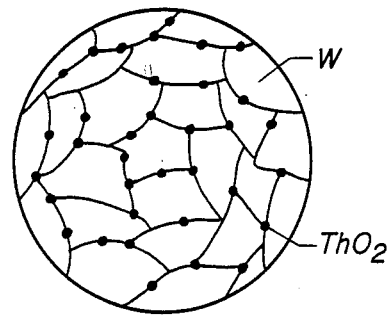
FIG. 4 is an enlarged section through a sintered rod of tungsten having 2 % thorium oxide according to the prior art.

FIG. 4 shows the condition after the sintering. Finer tungsten grains W are now present having as before uniform incorporation of the $ThO_2$ particles at the grain boundaries.

Figure 5:
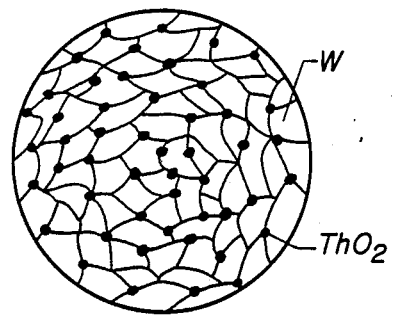
FIG. 5 is an enlarged section through a prehammered rod of tungsten with 2 % thorium oxide according to the prior art.
Figure 6:
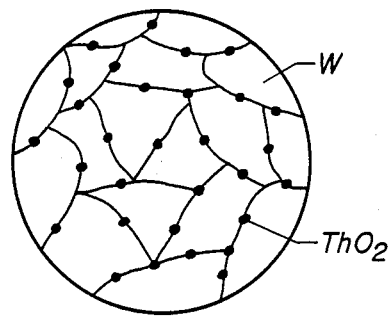
FIG. 6 is an enlarged section through a recrystallized rod of tungsten with 2 % thorium oxide according to the prior art.

Following the next method step, the mechanical working of the sintered rod, the prehammered rod shown in section in FIG. 5 results in which only a limitedly workable tungsten structure with homogeneously distributed $ThO_2$ particles is present. Following the subsequent recrystallization, in accordance with FIG. 6 a recrystallized rod then results in which coarse easily workable tungsten structure with uniform $ThO_2$ particle distribution is present.

In the method according to the invention for producing alloyed tungsten rods, in particular tungsten electrodes, a preparation step for lanthanum oxide is carried out before the actual mixing operation. In this preceding method step a purification of the lanthanum oxide with an average grain size of 2 to 2.5 $\mu$m takes place with the aid of a narrow-mesh horizontal oscillating sieve, impurities and coarse lanthanum bodies being removed so that the lanthanum oxide is present with a purity of 99.99 %. Thereafter this extremely pure lanthanum oxide ($La_2O_3$ or other oxidation stages) is heaped for at least 20 hours at slightly elevated room temperature, about 25 to 30° C., with an initial layer thickness of about 2 cm in a flat coated container. This results in a so-called "working out" of the lanthanum oxide, a relaxing operation in which the lanthanum oxide grains increase their specific volume to about 3 to 4 times the initial volume and break down into very small particles with an average grain size of 0.5 $\mu$m.

The pulverulent tungsten is now alloyed with the highly pure relaxed lanthanum oxide additive of about 0.8 to 2.2 % by weight with respect to the total weight during the mixing operation in such a manner that an extremely homogeneous lanthanum dispersion takes place.

Figure 1:
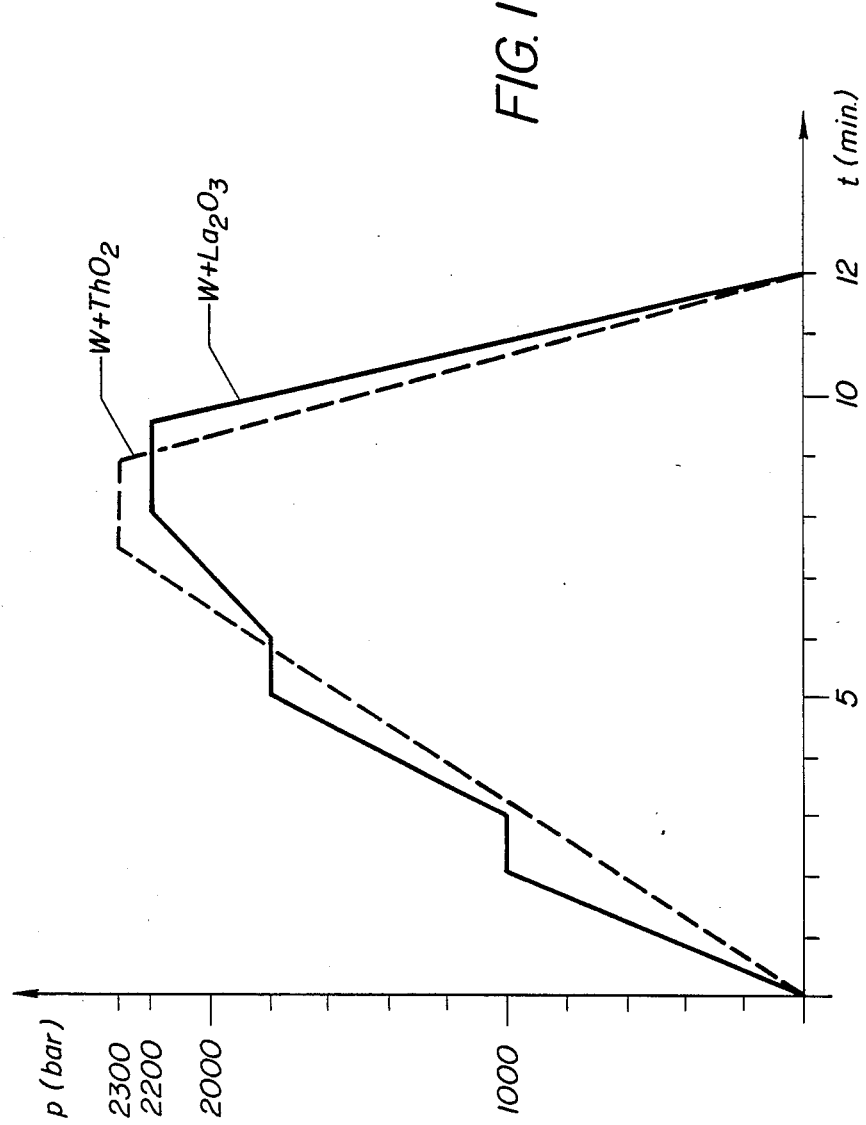
FIG. 1 is a diagram showing the time profile of the compacting operation for a tungsten alloy; in dashed line tungsten with 2 % thorium oxide is shown and in full line tungsten with 2 % lanthanum oxide.

The next method step, the compacting, is carried out according to the invention with a multiphase pressure buildup to avoid destruction of the compacted blanks. FIG. 1 shows in dashed line the time compacting operation of a thoriated tungsten rod and in full line the compacting operation of a tungsten rod with 2 % lanthanum additive. The compacting is carried out isostatically. The pressure variation on compacting tungsten with 2 % lanthanum oxide takes place up to the first maintaining stage at about 1000 bar comparatively faster than with the thoriated tungsten rod. The first retention or maintaining stage lies according to FIG. 1 at 1000 bar and is retained for about 1 minute. This is followed by a further pressure increase over a period of 2 minutes up to a pressure of 1800 bar. At this pressure the second maintaining stage is reached and is likewise retained for about 1 minute. Finally, after a further 2 minutes the maximum compacting pressure of 2200 bar is reached and is retained for about 1.5 minutes. The pressure reduction is then effected without maintaining or stopping stages. Compared with the pressure treatment of tungsten with 2 % thorium oxide FIG. 1 shows that the maximum compacting pressure with tungsten with lanthanum oxide lies about 100 bar lower than with tungsten with thorium oxide. This method stage can thus be carried out with the method according to the invention with a comparatively lower energy expenditure.

Figure 2:
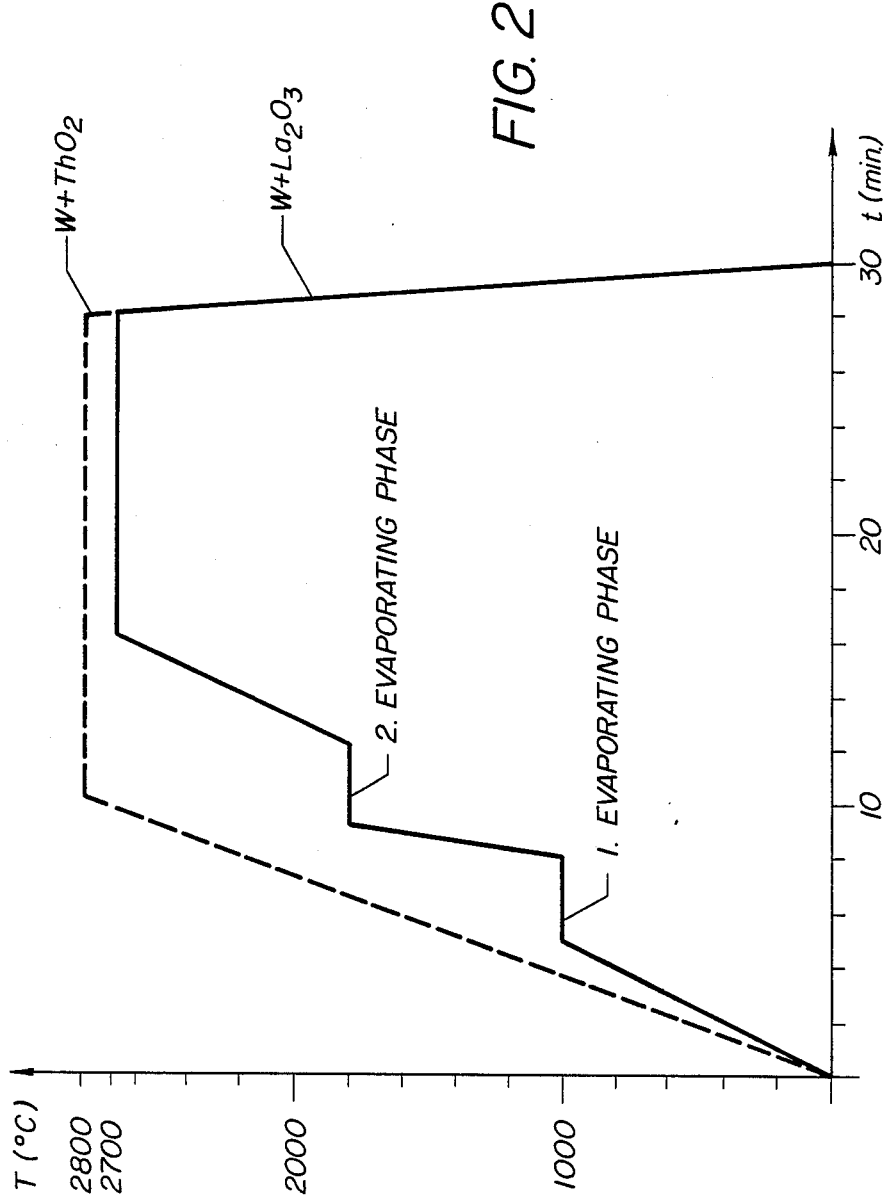
FIG. 2 is a graphical illustration of the temperature profile for the sintering operation, the alloy of tungsten with 2 % thorium oxide being shown in dashed line and alloy of tungsten with 2 % lanthanum oxide in full line.

FIG. 2 shows a sintering scheme for tungsten with thorium oxide (dashed line) and tungsten with lanthanum oxide (full line). Whereas with the thoriated tungsten a direct temperature increase up to a maximum temperature of about 2800° C. takes place the sintering of tungsten with lanthanum oxide according to the invention takes place via two temperature maintaining or holding stages. The first temperature holding stage lies according to FIG. 2 at about 1000° C. and is achieved after 5 minutes. This first temperature maintaining stage lies in the region of the evaporation point of lanthanum oxide (first evaporating phase) this is followed within a time of 1 minute by a temperature increase to about 1800° to a second maintaining stage (second evaporating phase) which is maintained for about 3 minutes. After a further 4 minutes the maximum sintering temperature of about 2700° C. is then reached. The sintering temperature of tungsten with lanthanum oxide component is about 100° C. lower than tungsten with thorium oxide component because with increasing alloyed component the necessary sintering temperature decreases. The lower sintering temperature of tungsten with lanthanum oxide likewise means a relatively low energy expenditure for this method step.

With the temperature variation carried out according to the invention account is taken in advantageous manner in the sintering at the two maintaining stages of the diameter fluctuations of the compact blank with regard to the lowest diameter value and the highest diameter value. Due to the temperature gradient running from the inside to the outside in the usual heating utilizing the resistance of the rod in the region of the smallest diameter of the compact blank during the first temperature maintaining stage, the first evaporating phase, a diffusion out of part of the lanthanum oxide takes place and at the same time an evaporation of all the included impurities, for example iron, molybdenum, nickel, etc., which make up a total content of about 0.06 % by weight. In the second temperature maintaining stage a diffusing out then takes place taking account of the greatest diameter range of the compact blank. The two temperature maintaining stages thus ensure that over the entire cross-section or the entire length of homogeneous diffusion takes place even with fluctuating diameter sizes. Furthermore, the evaporation phases provided according to the invention advantageously achieve that at the rod periphery a depletion of lanthanum oxide takes place. This makes it possible in the subsequent processing operations to achieve a directional recrystallization at the edge of the compact blank with a substantially greater grain growth. In the subsequent deformation at the outer side of the compact blank a relatively large easily deformable grain is present whilst in the interior of the compact blank there is a relatively fine grain. This makes it possible to carry out a working without any problems from the outside.

The mechanical working is carried out according to the invention by hammering at a temperature of 1500° C., lengthening of the rod and simultaneously in advantageous manner a homogenization of the grain size and the lanthanum oxide dispersion in the cross-section of the hammered rod taking place.

In the hammering a grain diminution occurs in the rod and after the treatment a fine uniform tungsten grain is present with an increased lanthanum oxide concentration in the rod centre, i.e. a nonuniform lanthanum oxide distribution over the cross-section of the rod.

Finally, in a last method step a recrystallization treatment is carried out in which the rod is heated under a protective gas, e.g. $H_2$, to a temperature of about 2000° C. As a result of the recrystallization in the outer region of the rod in advantageous manner a very coarse grain is now present whilst in the interior a fine grain remains. This step favourably reduces the recrystallization-inhibiting effect of lanthanum oxide in the outer region and by a controlled grain distribution the further workability is promoted.

The rod then obtained can be further worked down to a small final diameter, a homogenization in the grain structure and in the lanthanum oxide distribution finally being achieved.

The various grain stuctures in the various method steps will now be explained in detail with reference to FIGS. 7 to 10 for tungsten with 2 % lanthanum oxide.

Figure 7:
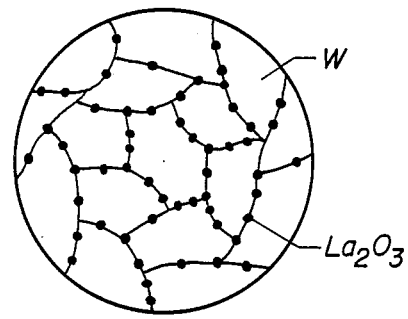
FIG. 7 is an enlarged section through a compacted blank of tungsten with 2 % lanthanum oxide.

FIG. 7 shows a compacted blank of tungsten with 2 % lanthanum oxide in which a group of tungsten grains with homogeneous lanthanum oxide distribution is uniformly present. Due to the fact that the specific weight of lanthanum oxide is a factor of about 1.8 lower than that of thorium oxide the concentration of lanthanum oxide in the compacted blank is substantially higher, as a direct comparison with FIG. 3 shows.

Figure 8:
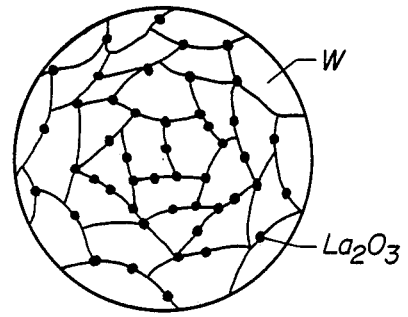
FIG. 8 is an enlarged section through a sintered rod of tungsten with 2 % lanthanum oxide.

The enlarged section through the sintered rod of tungsten with 2 % lanthanum oxide according to FIG. 8 shows a somewhat coarser tungsten grain W at the edge than in the centre. Moreover, at the edge due to evaporation in sintering depletion of $La_2O_3$ is present in order to obtain subsequently an easily deformable structure. In the middle of the sintered rod the concentration of $La_2O_3$ is greater. Very informative here is once again a comparison with the sintered rod of tungsten with 2 % thorium oxide shown in FIG. 4.

Figure 9:
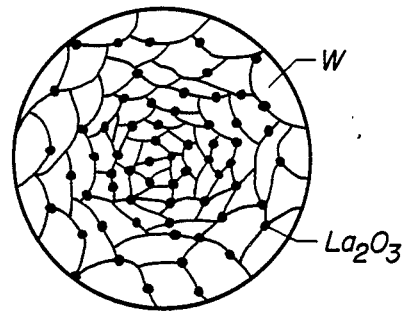
FIG. 9 is an enlarged section through a prehammered rod of tungsten with 2 % lanthanum oxide.

In FIG. 9 the enlarged section of a prehammered rod exhibits at the edge a coarse tungsten grain and in the centre a fine tungsten grain. This is due to the fact that by the depletion of $La_2O_3$ at the edge of the rod during the prehammering itself at a temperature of 1550° C. recrystallization takes place and a very easily workable tungsten structure is thus obtained.

Figure 10:
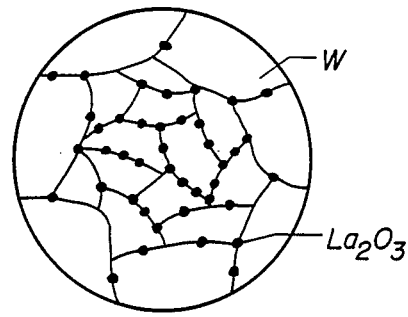
FIG. 10 is an enlarged section through a recrystallized rod of tungsten with 2 % lanthanum oxide.

The section shown in FIG. 10 through a recrystallized rod shows at the outside a very coarse grain with a depletion of $La_2O_3$ at the edge. This structure is extremely easy to work and permits in advantageous manner also the production of very small diameters in the range of 1.0 mm. In addition, this grain structure has the advantage that on further working a homogenization of the $La_2O_3$ takes place due to the distortion of the grain boundaries.

I claim:

1. Method for producing alloyed tungsten rods, in particular tungsten electrodes for tungsten inert gas welding, tungsten plasma welding, tungsten plasma fusion cutting and the like, in which pulverulent tungsten with an admixed lanthanum oxide additive is compacted, sintered, mechanically worked and subjected to a recrystallization treatment, wherein
    (a) lanthanum oxide is prepared to an average grain size of 0.5 to 2.0 μm by storing at 25 to 30° C. for at least 20 hours,
    (b) the pulverulent tungsten is alloyed with the prepared lanthanum oxide additive of 1.8 to 2.2 % by weight with respect to the total weight, and wherein
    (c) compacting with a multiphase pressure buildup and sintering with a multiphase temperature buildup is performed.

2. Method according to claim 1, wherein the volume-increasing treatment according to step (a) is carried out by keeping the lanthanum oxide at 25 to 30° C. for several days.

3. Method according to claim 1, wherein the multiphase pressure buildup takes place via two maintaining stages.

4. Method according to claim 3, wherein the pressure increase is carried out in such a manner that the first holding or maintaining stage lies in the pressure range from 900 to 1100 bar, is reached after 1.5 to 2.5 minutes and is retained for about 1 minute, that the second maintaining stage lies in the pressure range of 1700 to 1900 bar, is reached after a further 1.5 to 2.5 minutes and is retained for about 1 minute and that the maximum pressure of about 2200 bar is reached 1.5 to 2.5 minutes after the second maintaining stage.

5. Method according to claim 4, wherein the maximum compacting pressure is maintained for 1 to 2 minutes.

6. Method according to claim 1, wherein the multiphase temperature buildup is carried out via two temperature maintaining stages.

7. Method according to claim 6, characterized in that the temperature increase is carried out in such a manner that after 4 to 6 minutes a first maintaining stage is reached at 900 to 1100° C. and that said stage is retained for 2 to 4 minutes, that the second maintaining stage at 1700 to 1900° C. is reached after a further 1 to 3 minutes and then retained for 2 to 4 minutes and that the maximum sintering temperature in the region of 2700° C. is reached after a further 3 to 5 minutes.

8. Method according to claim 7, wherein the maximum sintering temperature is maintained for 14 to 16 minutes.

* * * * *